United States Patent [19]

Harada et al.

[11] Patent Number: 5,097,431
[45] Date of Patent: * Mar. 17, 1992

[54] EVALUATION METHOD OF FLOW ANALYSIS ON MOLDING OF A MOLTEN MATERIAL

[75] Inventors: Susumu Harada; Shigeru Fujita, both of Shizuoka, Japan

[73] Assignee: Toshiba Machine Co., Ltd., Tokyo, Japan

[*] Notice: The portion of the term of this patent subsequent to Mar. 17, 2009 has been disclaimed.

[21] Appl. No.: 595,770

[22] Filed: Oct. 10, 1990

Related U.S. Application Data

[63] Continuation of Ser. No. 241,202, Sep. 7, 1988, abandoned.

[30] Foreign Application Priority Data

| Sep. 8, 1987 [JP] | Japan | 62-223073 |
| Sep. 8, 1987 [JP] | Japan | 62-223074 |
| Oct. 12, 1987 [JP] | Japan | 62-254772 |

[51] Int. Cl.$^5$ .......................... G06F 15/46; B29G 3/00
[52] U.S. Cl. ..................... 364/578; 364/510; 364/550; 364/476; 425/170; 264/328.1
[58] Field of Search .............. 364/510, 550, 578, 557, 364/518, 521; 340/618, 622; 264/327, 328.1; 425/169, 170, 171, 173

[56] References Cited

U.S. PATENT DOCUMENTS

| 4,044,600 | 8/1977 | Claxton et al. | 364/473 |
| 4,344,142 | 8/1982 | Diehr, II et al. | 364/473 |
| 4,504,920 | 3/1985 | Mickowski | 364/550 |
| 4,534,003 | 8/1985 | Manzione | 364/476 |
| 4,641,270 | 2/1987 | Lalloz et al. | 364/476 |
| 4,674,053 | 6/1987 | Bannai et al. | 364/476 |
| 4,750,131 | 6/1988 | Martinez | 364/476 |
| 4,773,021 | 9/1988 | Harris et al. | 364/476 |
| 4,810,438 | 3/1989 | Webster et al. | 364/476 |

Primary Examiner—Parshotam S. Lall
Assistant Examiner—Brian M. Mattson
Attorney, Agent, or Firm—Young & Thompson

[57] ABSTRACT

An evaluation method analyzes flow on molding of a molten material. This is achieved in a system of making a flow analysis on an in-mold molten material through division of a molded part model into minute elements and numerical analysis thereof including the calculi of finite elements, boundary elements, finite differences, FAN and the like. One or more temperature conditions of the molten material are provided with a plurality of loading times or mold temperatures respectively for performing an analysis and from the obtained operational results of the pressure distribution of the molten material a function of the maximum molten material pressure of each element is provided. This function is graphically indicated on a display apparatus to evaluate the appropriate ranges of the molten material pressure and the loading time at a predetermined molten material temperature.

7 Claims, 7 Drawing Sheets

G

G

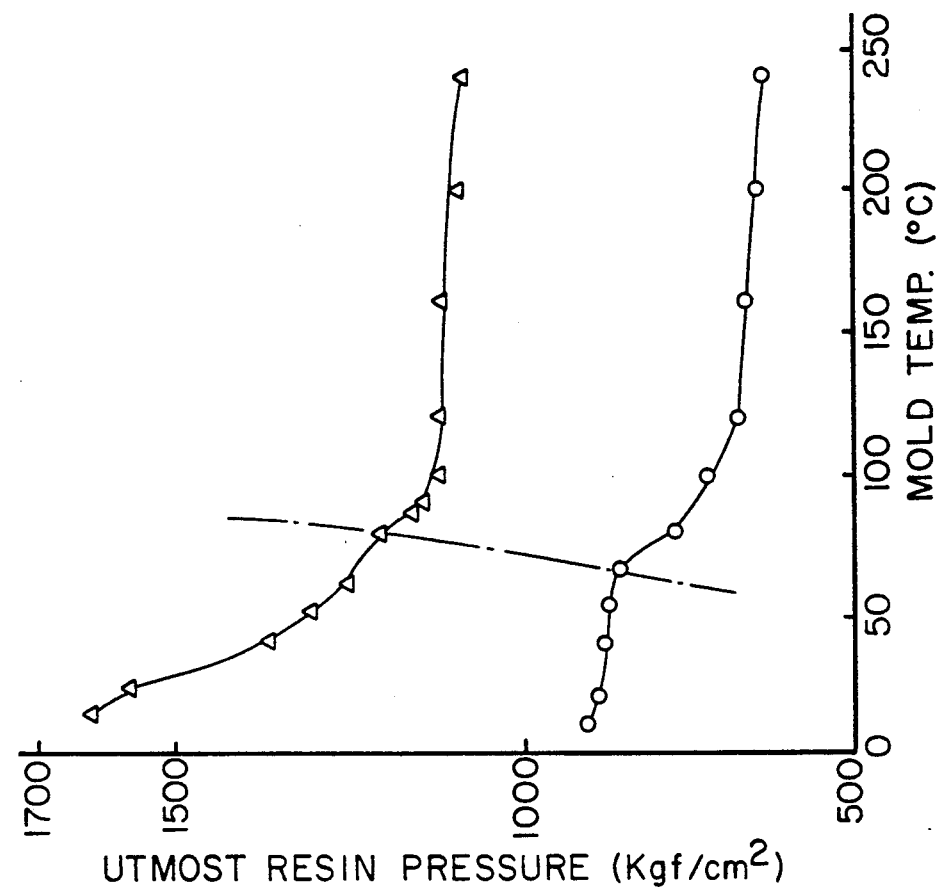
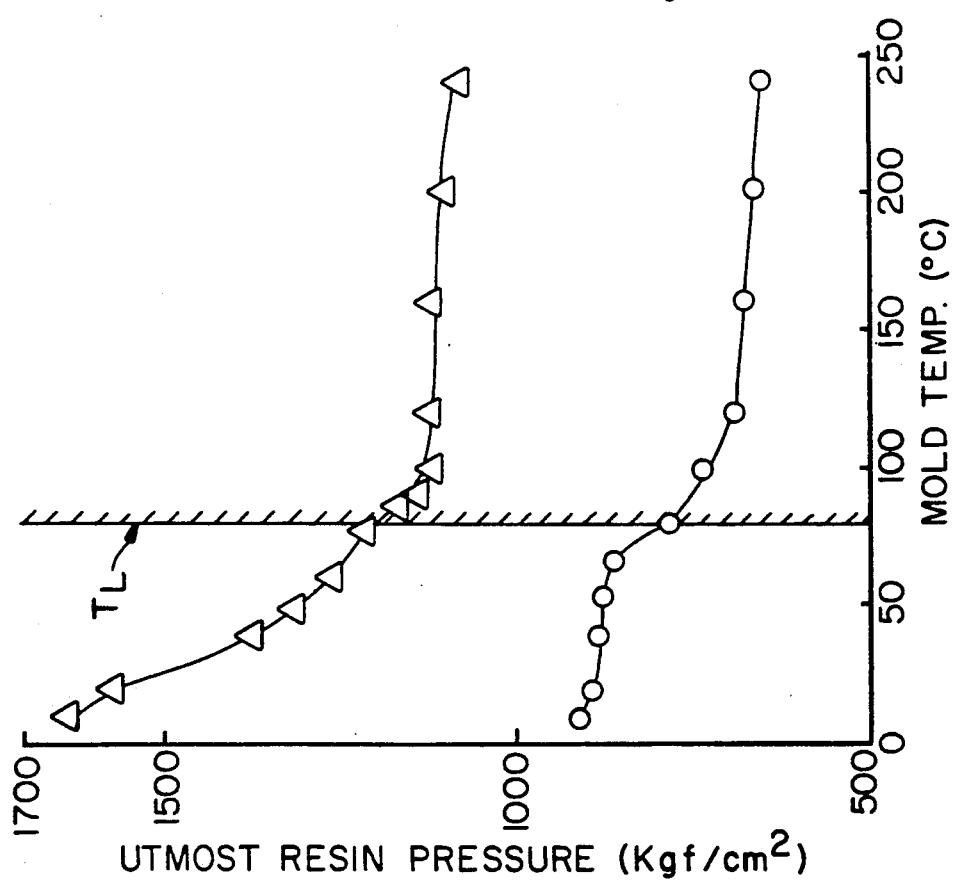

EVALUATION METHOD OF FLOW ANALYSIS ON MOLDING OF A MOLTEN MATERIAL

This application is a continuation of application Ser. No. 07/241,202, filed Sept. 7, 1988, now abandoned.

FIELD OF THE INVENTION

This invention relates to an evaluation method for determining the optimum conditions for producing a molded part of high quality by molding molten materials such as resin, and more particularly to an evaluation method for determining the optimum ranges of the maximum molten material pressure and the mold temperature at a predetermined molten material temperature.

BACKGROUND OF THE INVENTION

Hitherto, in case of making an analysis such as simulation of a resin flow within a mold for injection-molding of resin materials, there has been generally utilized a method of operating the equations of molten, continuation and energy of the fluid through breakdown of a molded part model into minute elements and numerical analysis thereof including the calculi of finite elements, boundary elements, finite differences, FAN and the like, as shown in FIG. 1.

In such an analysis of a resin flow within a mold, the selection of a resin to be employed and the operating conditions of a molding machine such as resin temperature, mold temperature and loading speed are input for operation, so that the required calculations are carried out to output a loading pattern such as that shown in FIG. 2 showing a loading process or time of the resin, a pressure distribution such as that shown in FIG. 3, a temperature distribution such as that shown in FIG. 4, and the like.

The conventional resin flow analysis as described hereinbefore, however, has been unknown with regard to a means for determining whether or not input conditions are appropriate, whether or not there are more appropriate input conditions, or which is the best among available input conditions. Accordingly, the operation parameters must have been determined relying on the experimental observations obtained from repeated comparisons between the analytic results and the actual moldings.

Thus, the conventional analysis method has been carried out for purpose of inputting the resin temperature, the mold temperature and the loading speed available by experiments to determine the suitabilities of the shape of the molded part, such as the part thickness, the location and number of gates, the runner size and the like, but not yet tried for evaluation of suitabilities of the molding conditions.

Such an analysis method, on the other hand, aims at determining the suitability and difficulty of molding on account of operations by a program before manufacturing a mold at a stage when a design for a resin molded part has been completely thereby to fulfill the required conditions for production of the molded parts, and such method is desired not only to determine the suitability of the mold shape such as the part thickness, the location and number of gates, measurements of a gate and a runner and the like, but also to calculate an appropriate range of the molding condition or the optimum molding condition to finally determine the operational condition of a molding machine.

Accordingly, the invention aims to provide an evaluation method of flow analysis on molding of a molten material for determination of the optimum ranges of the molten material temperature and the loading time at a predetermined mold temperature.

SUMMARY OF THE INVENTION

In order to achieve the above object, the invention provides an evaluation method of flow analysis on molding of a molten material in a system of making a flow analysis on an in-mold molten material through breakdown of a molded part model into minute elements and numerical analysis thereof including the calculi of finite elements, boundary elements, finite differences, FAN and the like, wherein one or more temperature conditions of the molten material are provided with a plurality of loading times or mold temperature respectively for conducting analysis and from the obtained operational results of the pressure distribution of the molten material after loading, function of the maximum molten material pressure in each element, is provided, said function being graphically indicated on a display apparatus to determine appropriate ranges of the molten material pressure and the loading time at a predetermined mold temperature.

In the above evaluation method, the function $Pn = fn_1(t)$ of the maximum molten material pressure with a variable of the loading time provides a critical value for the absolute value of the differential value $dPn/dt$ thereof to evaluate the function and determine appropriate ranges of the molten material pressure and the loading time.

Furthermore, the function $Pn = f2n(Tm)$ of the maximum molten material pressure with the variable mold temperature provides a critical value where a mold temperature $Tm$ is dependent on a solidification temperature $Tc$ of the molten material so as to evaluate the function and determine appropriate fluctuation ranges of the molten material pressure and the mold temperature.

Moreover, the function $Pn = f\,n_2(Tm)$ of the maximum molten material pressure with a variable of the mold temperature provides a critical value for the differential value $dPn/dTm$ thereof so as to evaluate the function and determine the appropriate fluctuation ranges of the molten material pressure and the mold temperature.

In the above evaluation method, from the obtained operation results of the pressure distribution of the molten material the maximum molten material pressure on an evaluation subject portion of each element at every mold temperature is provided under every temperature condition of the molten material and from the data of the mold temperatures $Tn$, $Tn+1$ at two adjoining points and the corresponding maximum molten material pressures $Pn$, $Pn+1$, deviations $\Delta Tn$ $(=Tn+1-Tn)$ and $\Delta Pn$ $(=Pn+1-Pn)$ and a deviation ratio $\Delta Pn/\Delta Tn$ are provided respectively for successive repetition, and then an increasing gradient $\Delta Sn$ $(=\Delta Pn+1/\Delta Tn+1-\Delta Pn/\Delta Tn)$ of the deviation ratio is sequentially calculated to compute a mold temperature $T_B$ where the positive and negative positions of the increased gradient $\Delta Sn$ are reversed, so that the function of the maximum molten material pressure having a variable of the mold temperature may be represented as two different functions $Pmel = f_1(T)$ and $Psol = f_2(T)$ defining the computed mold temperature $TB$ as a boundary.

In this case, two different functions $Pmel=f_1(T)$ and $Psol=F_2(T)$ may graphically be indicated on a display apparatus so as to determine the appropriate fluctuation ranges of the molten material pressure and the mold temperature at a predetermined molten temperature.

Furthermore, a critical value is inparted to either one of the differential values $dPmel/dT$ and $dPsol/dT$ of two different functions $Pmel=f_1(T)$ and $Psol=f_2(T)$ of the maximum molten material pressure having a variable of the mold temperature to evaluate the function for determination of the appropriate fluctuation ranges of the molten material pressure and the mold temperature.

According to the evaluation method of the invention, on account of the operation results of the pressure distribution of the molten material relative to the fluctuation of the mold temperature, the maximum molten material pressure of each divided element of the molded part model may be represented by a function having the loading time or the mold temperature as a variable, said function being graphically indicated on the display apparatus to evaluate the appropriate ranges of the maximum molten material pressure and the loading time or the mold temperature.

In this case, a differential value of the function of the maximum molten material pressure after the loading finished may be provided with a critical value to determine the appropriate ranges of the molten material pressure and the loading time in consideration of stability of the molten material pressure when the loading speed is varied.

Furthermore, the function of the maximum molten material pressure having a variable of the mold temperature may be provided with a critical value where a mold temperature depends on the solidification temperature of the molten material or a differential value of the function may be provided with a critical value to determine the appropriate ranges of the molten material temperatures and the mold temperature in consideration of the stability of the maximum molten material pressure when the mold temperature is changed.

On the other hand, the mold temperature defining a boundary between a melt region and a solid region of the molten material after the loading is finished, is computed to indicate the function as the different functions in relation to each region or a differential value of the function is provided with a critical value for determination of the appropriate ranges of the molten material temperature and the mold temperature in consideration of stability of the maximum molten material pressure when the mold temperature is varied.

Furthermore, the following molding conditions are generally required as the judging criteria for the flow analysis on molding of the molten materials like the resin materials:

(1) A loading time is preferably short
(2) A loading pressure is preferably low
(3) A resin temperature is preferably low
(4) A mold temperature is preferably low Namely, since a molten resin at a high temperature is charged into a mold at a low temperature on the loading process, the resin is cooled on loading, so that the temperature thereof is lowered with corresponding increase of the viscosity thereof, resulting in lowering of the fluidity and accordingly a slow loading speed causes an insufficient pressure transmission likely resulting in an inferior formation. For example, the uneven surface caused by the flow in the vicinity of the mold cavity end is not susceptible to a close contact with the surface of the mold cavity, leaving flow marks, or the shrinkage in a cooling process may not be rectified with formation of sink marks or an insufficient re-welding of the weld portion where the resin flows join, leading to undesired weld lines with deficiency in strength at the weld portion.

It is desired to finish the loading operation possibly in a short time. The excessively faster loading operation, however, causes various inferior phenomena like a deterioration to be brought by a partial heating of the resin by the shear exthermic heat in flowing, silver streaks to be formed on the surface of the molded part through gasification of the volatile matters contained, gas marks to be developed by a resin flow sealing the air remaining in a mold cavity for compression with heat insulation and jettings produced when a flow channel is not fully filled at the portion where the sectional area thereof is rapidly enlarged to form a strip flow with folding.

There is provided a controlling system for programming a loading speed in a multistage in accordance with a variation of the sectional area of the flow channel within a mold cavity so as not to form the portion where the flow speed in the mold becomes excessively fast but to finish the loading operation in a possibly short time without entailing any defects as hereinbefore described.

Moreover, the loading pressure is generally produced as a load resistance when a molten material of a certain viscosity is filled into a mold at a certain temperature and at a certain speed and it may be represented by an oil pressure of an injection cylinder for filling or by a molten resin pressure to be actually measured in a mold. Namely, the loading pressure is a parameter for indicating an easiness of the filling operation, for instance, a low filling pressure ensures a convenient filling operation as a desired condition. In case of a continuous molding operation, a constant filling pressure value at every shot shows the production at unvariable and steady quality.

A molten resin temperature and a mold temperature provide molding conditions relating to the apparent viscosity for indicating fluidity of the resin. The higher the both temperatures are, the lower the apparent viscosity is, resulting in the convenient filling operation. On the other hand, in case of a cycle operation of the injection molding wherein a molded part after cooled is withdrawn from the mold, the molding cycle is retarded by the high temperatures.

Accordingly, when the molten resin viscosity is held at a certain level to satisfy the magnitude and stability of the filling pressure, the thermal conditions of the resin and the mold may preferably be low.

For better understanding, the invention will now be described hereinbelow in more detail with reference to the accompanying drawings.

BRIEF DESCRIPTION OF THE DRAWINGS

FIG. 7 is a characteristic curve view of the maximum resin pressure against the mold temperature providing the resin material temperature as a parameter to show another embodiment of the evaluation method according to the invention;

FIG. 8 is a characteristic curve view of the maximum resin pressure against the mold temperature providing the resin material temperature as a parameter to show a further embodiment of the evaluation method according to the invention.

PREFERRED EMBODIMENTS OF THE INVENTION

Figure 1:
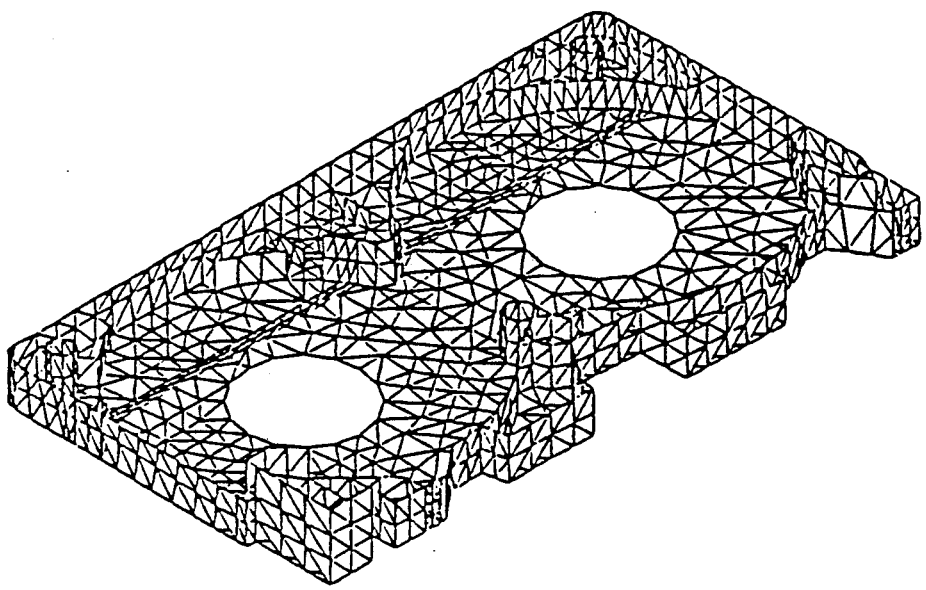
FIG. 1 is a graphic indication view of a state where a molded part model is divided into three-dimensional minute elements.
Figure 2:
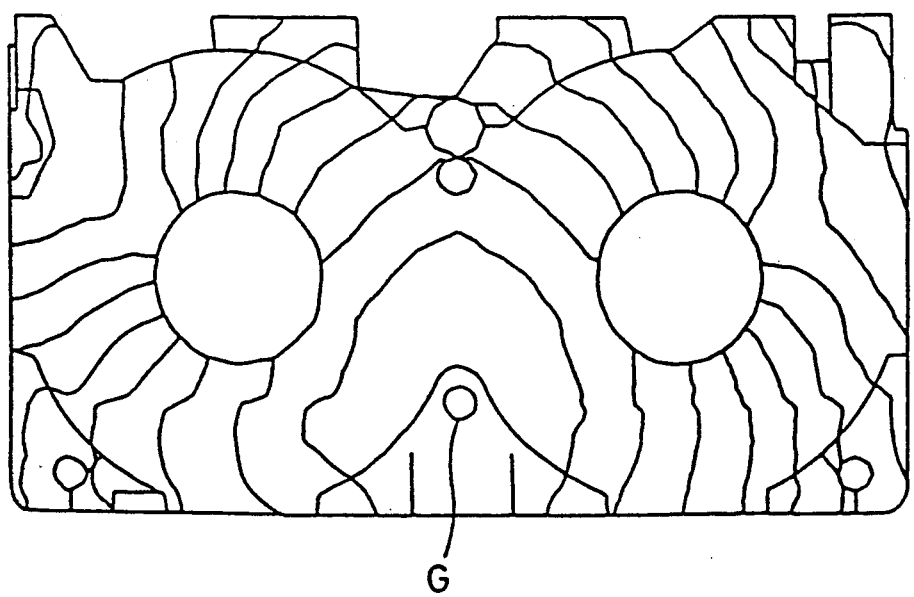
FIG. 2 is a uniform time line view of the loading pattern in the molded part model of FIG. 1.
Figure 3:
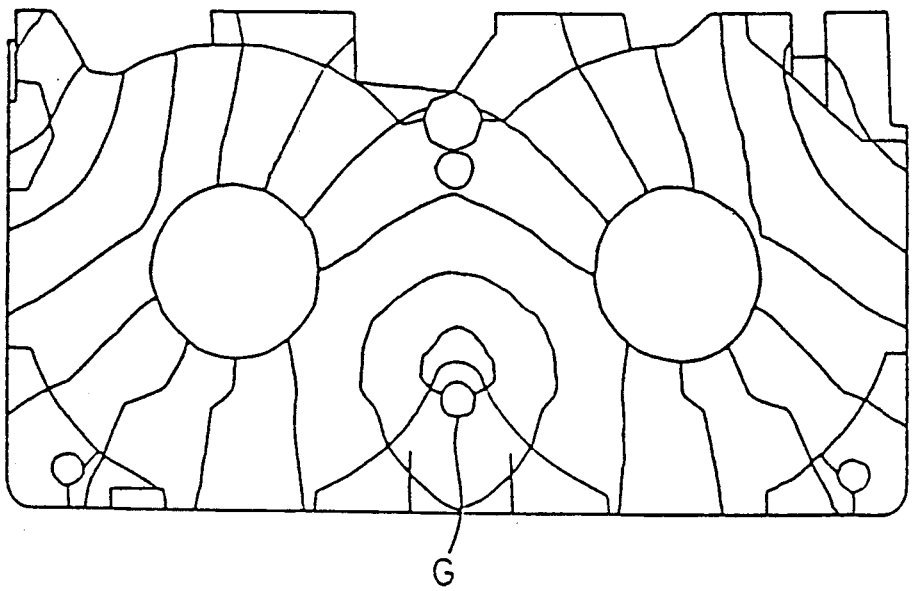
FIG. 3 is a uniform pressure line view of the loading pattern on the molded part model of FIG. 1.
Figure 4:
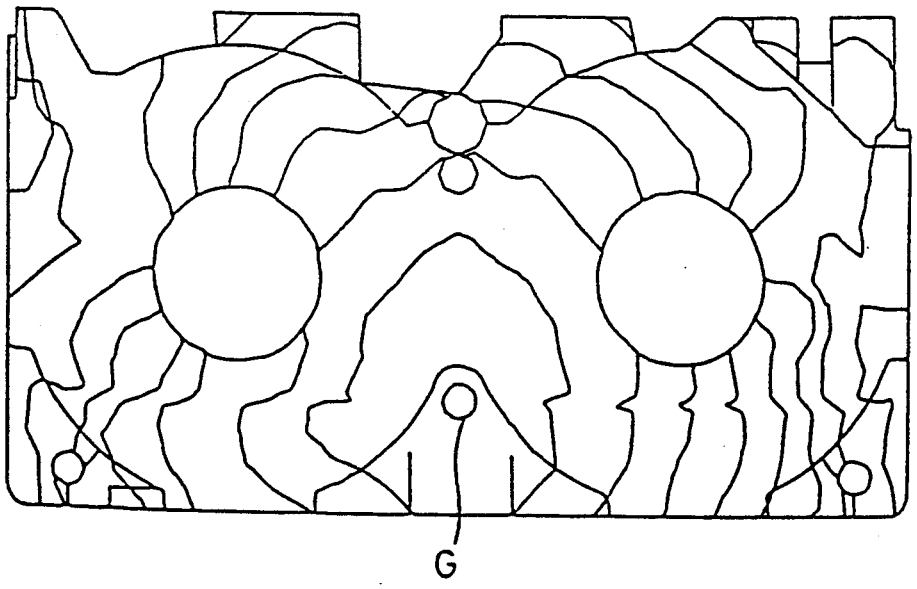
FIG. 4 is a uniform temperature line view of the loading pattern in the molded part model of FIG. 1.

In the invention, a procedure of conducting a resin flow analysis within a mold for a desired molded part model is substantially same as the conventional simulation method. Namely, as shown in FIG. 1, in order to effect the resin flow analysis within the mold, a molded part model is divided into elements (the illustrated example employs triangular elements, notwithstanding square elements are available) for application to the calcium of finite elements. For the molded part model, the location and number of gate G are provided together with a runner, if necessary, to determine the shape of the mold for the flow analysis. Then, a resin to be used is selected to input available information data of resin properties with subsequent input of the molding conditions such as resin temperature, mold temperature and loading speed for transition into analysis as likely carried out in the conventional method for resin flow analysis in the mold illustrated in FIGS. 2 and 4.

EXAMPLE 1

The mold temperature is fixed at 60° C., while one or more resin temperatures or resin temperatures of the nozzle portions are selected for three temperatures of 200° C., 220° C. and 260° C. Then, five molding conditions of the loading times such as 0.2, 0.5, 1, 2 and 3 seconds at every resin temperatures are provided to carry out the sequential analytical calculations. Among the resulting calculation data, the maximum resin pressure of all elements at an average temperature or a medium layer temperature of each element of the model is taken out through the resin temperature distribution data when the loading operation finished to provide the data for the loading time. The procedures are repeated to provide a graph of data of a characteristic curve view as shown in FIG. 5 with a resin temperature at a predetermined condition for the mold temperature as parameter showing the loading time as an abscissa and the maximum resin temperature as an ordinate.

Figure 5:
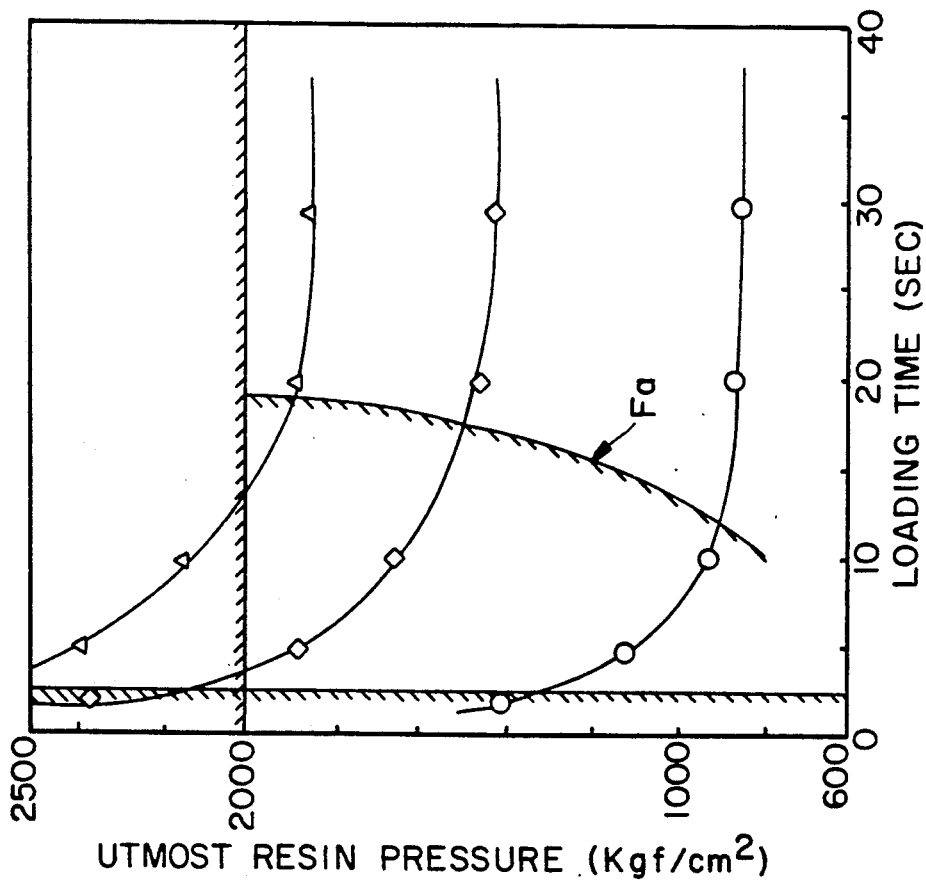
FIG. 5 is a characteristic curve view of the maximum resin pressure against the loading time of the resin temperature as a parameter showing one embodiment of the evaluation method of the flow analysis on molding of the molten material according to the invention.
Figure 9:
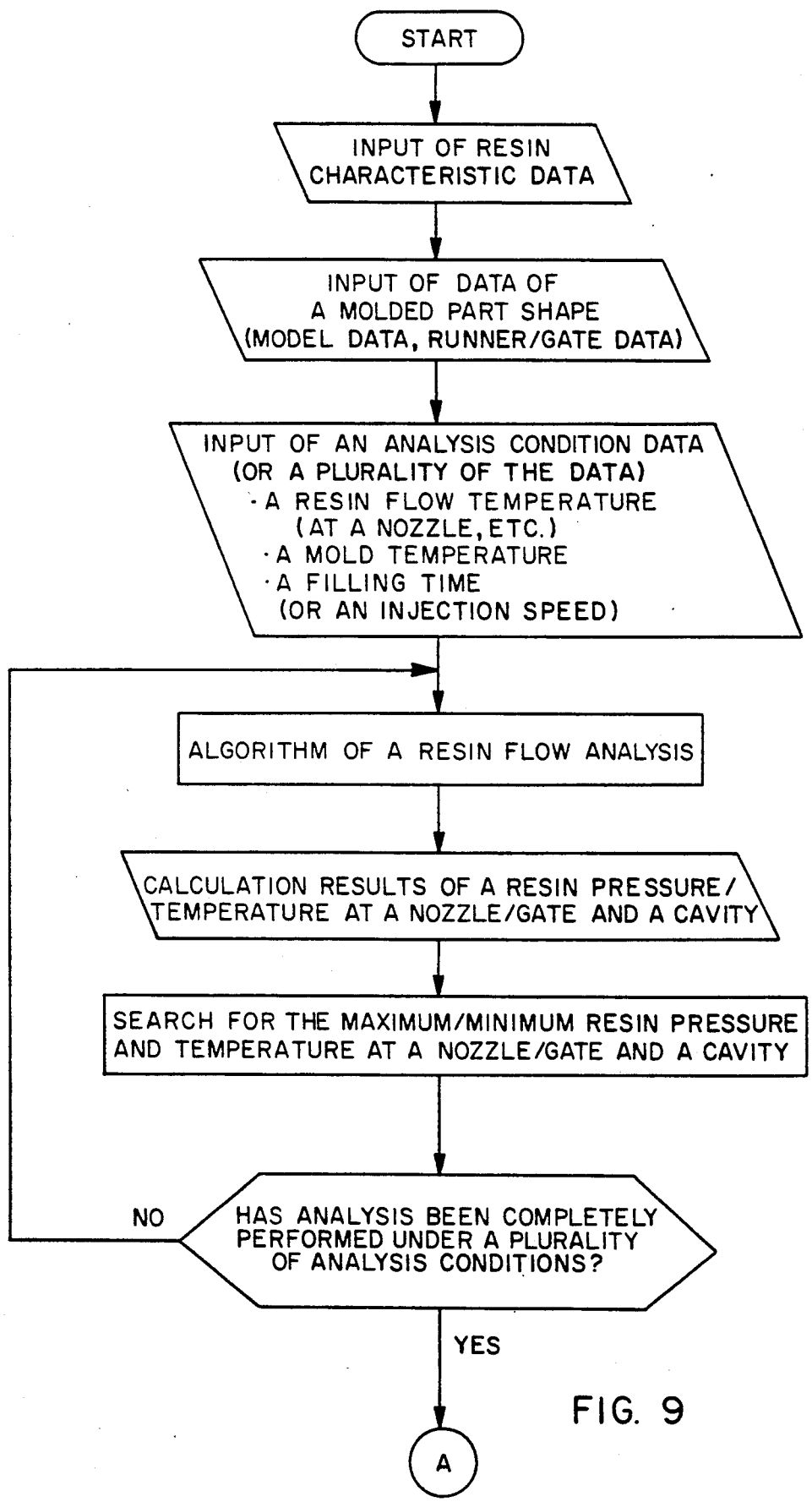
FIGS. 9, 10 and 11 together form a flow chart showing an example of a suitable operating sequence for carrying out the method of the invention.
Figure 10:
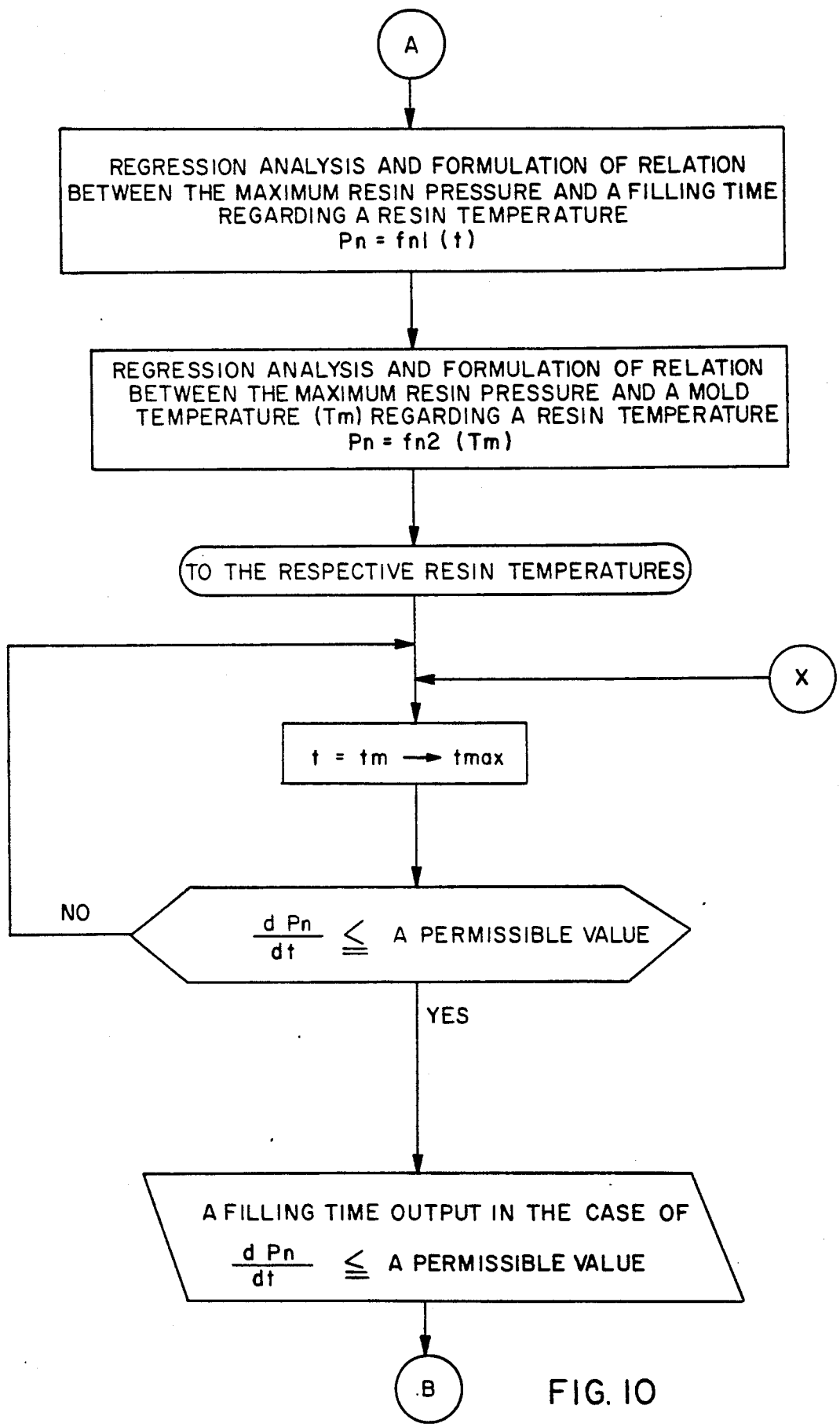
Figure 11:
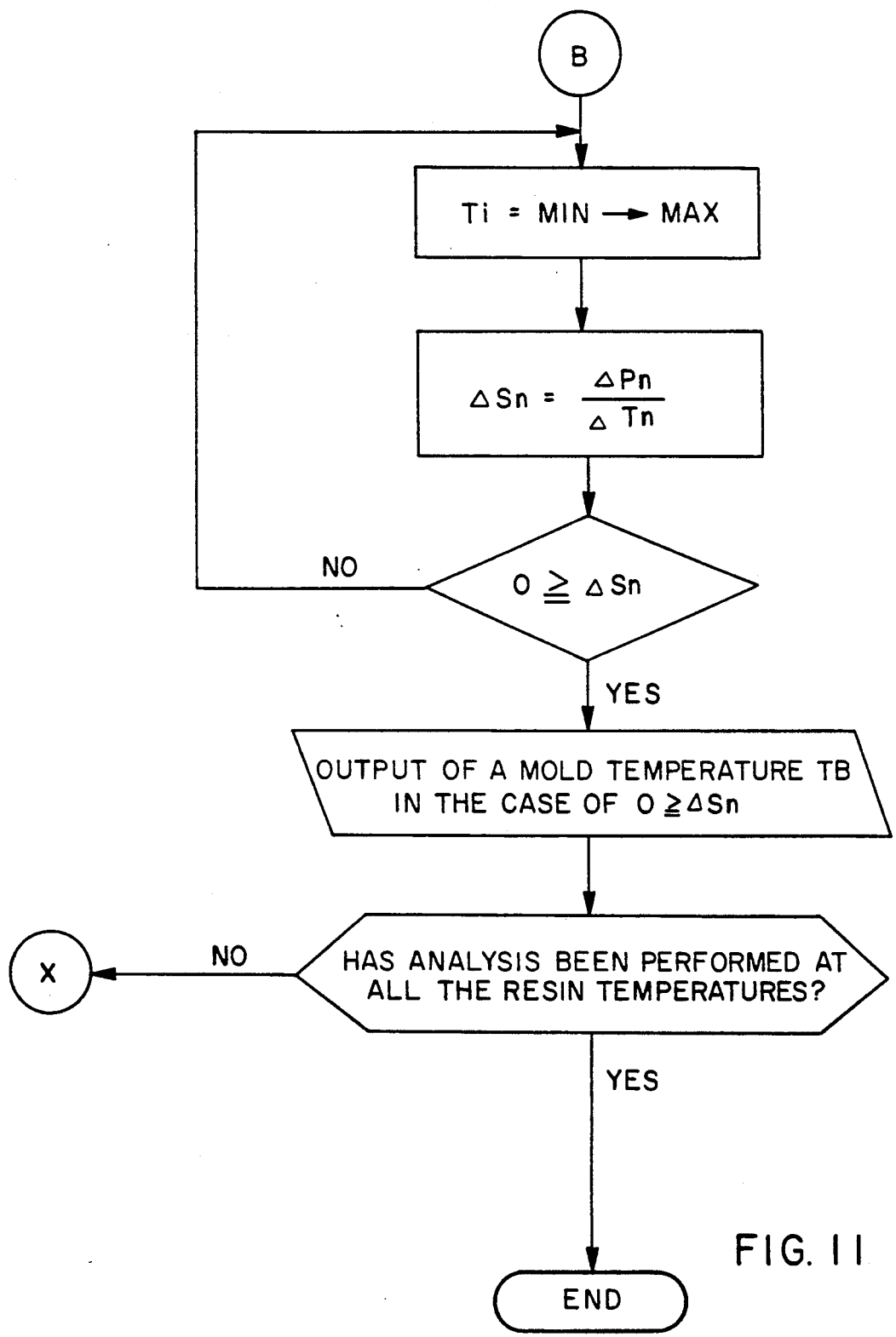

Then, the characteristic curve as shown in FIG. 5 is represented by the following formula:

$$Pn = f\,n_1(t) \quad (n = 1, 2, 3) \tag{1}$$

Referring to FIG. 5, Pm represents an upper limit of the resin pressure applicable to a molding machine to be used, while tm represents a loading time at an upper limit of the loading speed applicable to a molding machine to be used. Accordingly, the moldable region is indicated by the resin pressure $Pn < Pm$ and the loading time $t > tm$.

Further, the gradient of each characteristic curve as shown in FIG. 5 or the differential value $dPn/dt$ of the loading time of the function representing the maximum resin pressure with a variable of the loading time shows a stability of the fluctuation of the resin temperature when the loading finished where the loading time is varied. This value in this event is desired small.

On the other hand, the stability $dPn/dt$ of the resin pressure after the loading finished against the fluctuation of the loading time is variable in accordance with the properties of the resin to be used and the thickness and shape of the molded part, so that no absolute evaluation is available to fix the absolute value less than a certain value. To obtain more appropriate molding conditions, however, it is important to seize the trend of the fluctuation when the resin temperature or the loading time is changed.

Accordingly, a graphical indication of the graph in FIG. 5 on the display apparatus such as liquid crystal, CRT, plasma and EL is effective to determine appropriate conditions. Furthermore, an indication of the graph in FIG. 1 on a display apparatus ensures to seize the trends of fluctuations $dPn/dt$ as hereinbefore described, while a numerical expression of these functions may restrict an appropriate range of the resin temperature on indication of the display apparatus through a dialogue-type operation by giving the critical value to said $dPn/dt$.

Namely, a curve Fa shown by the dotted line in FIG. 5 represents the case where the differential value $dPn/dt$ is provided with a predetermined critical value, thereby showing the tolerance limit of the loading time for the characteristic curve of each maximum resin pressure.

EXAMPLE 2

Figure 6:
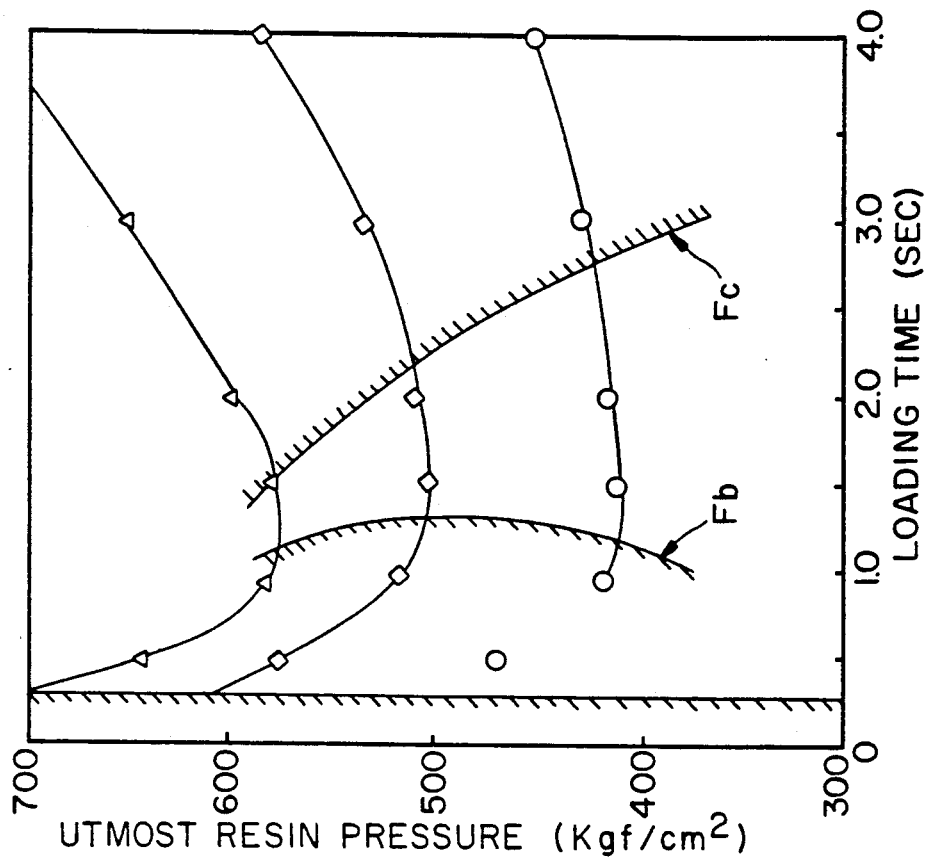
FIG. 6 is a characteristic curve view of the maximum resin pressure against the loading time like FIG. 5 but in use of crystalline resin material.

In this embodiment, a crystalline resin is used and a mold temperature is fixed at 60° C., while three resin temperatures 200° C., 220° C. and 260° C. are selected. Then, six loading times 0.5, 1, 1.5, 2, 3, and 4 seconds for every selected resin temperature are provided to effect a sequential analysis operations like Example 1. The characteristic curves based on the results obtained are shown in FIG. 6. Thus, in this embodiment the characteristic curve, like FIG. 5, may also be obtained. In this case, due to the difference in the resins used, the characteristic curves of FIG. 6 are different from those of FIG. 5 and every curves have a downward convex, so that the differential value $dPn/dt$ of the function $Pn = f\,n_1(t)$ of the maximum resin pressure for indicating stability of the maximum resin pressure when the loading time is changed requires positive and negative limits, so that a critical value of $dPn/dt$ is provided as an absolute value. Accordingly, to obtain the curves Fb and Fc a predetermined critical value is given to a differential value $dPn/dt$ indicating the tolerance loading time limit for each characteristic curve of the maximum resin pressure like the characteristic curves shown in FIG. 5.

EXAMPLE 3

In this embodiment, two resin temperature 200° C. and 260° C. are selected and the mold temperature is changed in the range of from 10° C. to 240° C. per every selected resin temperatures to provide a plurality of molding conditions for performance of sequential analysis operations. Through the resulting data of resin pressure distribution when the loading finished, the maximum resin pressure at each element of the model is picked up as data at the mold temperature. The procedures are repeated to obtain the desired data in the form of graph and then provide a characteristic curve as shown in FIG. 7 with the resin temperature as a parameter, showing the mold temperature on the abscissa and the maximum resin pressure on the ordinate.

Then, the formula of the characteristic curve as shown in FIG. 7 may be represented by the following formula:

$$Pn = f_{n2}(Tm) \ (n=1, 2) \quad (2)$$

Referring to FIG. 7, $T_L$ represents a critical value provided with reference to the solidification temperature Tc of the resin to be used and the temperature thereabove is considered as a region when the molding with stable production becomes impossible.

Furthermore, the gradient of each characteristic curve as shown in FIG. 7 or the differential value dPn/dTm of the mold temperature of the function indicating the molten resin pressure with the mold temperature as a variable shows a stability of the fluctuation of the resin pressure when a mold temperature is changed. Therefore, this value should preferably be small.

On the other hand, the critical value $T_L$ relying on the solidification temperature Tc of the resin used and the stability dPn/dTm of the maximum resin pressure against the fluctuation of the mold temperature are variable in accordance with the properties of the resin used and the shape of the molded part, so that no absolute evaluation is available to fix the absolute value. However, in order to obtain more appropriate molding conditions, it is important to seize the trend of the fluctuation when the resin pressure or the mold temperature is varied.

Accordingly, an indication of the graph as shown in FIG. 7 on the display apparatus such as liquid crystal, CRT, plasma and EL is effective to determine appropriate conditions. Furthermore, an indication of the graph as shown in FIG. 7 on a display apparatus is effective to seize the trends of fluctuations of the critical value $T_L$ or dPn/dTm as hereinbefore described, while the numerical formula of the functions enable to restrict the appropriate range of the mold temperature on indication of the display apparatus through a dialogue-type operation by giving the critical value to the critical value $T_L$ or dPn/dTm.

EXAMPLE 4

In this embodiment, two resin temperature 220° C. and 260° C. are selected and then mold temperature is varied in the range from 10° C. and to 240° C. at every selected resin temperature to provide a plurality of molding conditions for the sequential analysis operations. Through the resultant data of resin pressure distribution when the loading is finished, the maximum resin pressure at each element of the model is picked up as data at the mold temperature. The procedures are repeated to obtain the desired data in the form of graphs and to provide a characteristic curve view as shown in FIG. 8 with the resin temperature as a parameter, showing the mold temperature on the abscissa and the maximum resin pressure on the ordinate.

Then, with reference to the characteristic curves as shown in FIG. 8, the mold temperatures of two adjoining points and the corresponding maximum resin pressures thereto are worked out. For example, the mold temperatures are represented by Tn and Tn+1, while the corresponding maximum resin pressures are represented by Pn and Pn+1. From the resulting data, the deviation $\Delta Tn$ of the mold temperature and the deviation $\Delta Pn$ of the maximum resin pressure are worked out by the following formula:

$$\Delta Tn = Tn+1-Tn \quad (3)$$

$$\Delta Pn = Pn+1-Pn \quad (4)$$

Furthermore, from the results of the above formulae (3) and (4) are worked out the deviation $\Delta Pn$ of the maximum resin pressure, the deviation $\Delta Tn$ of the mold temperature and the ratio. $\Delta Pn/\Delta Tn$ of these deviations.

Similarly, from the data of the next adjoining mold temperatures (Tn+1, Tn+2) and the corresponding maximum resin pressures (Pn+1, Pn+2) are worked out the deviation $\Delta Tn+1$ of the mold temperature, the deviation $\Delta Pn+1$ of the maximum resin pressure and the ratio $\Delta Pn+1/\Delta Tn+1$ of these deviations in sequence.

Thus, from the operation results the increased gradient $\Delta Sn$ of the ratio of the above deviations are worked out through the following formula.

$$\Delta Sn = \Delta Pn+1/\Delta Tn+1 - \Delta Pn/\Delta Tn \quad (5)$$

By similarly carrying out the operation according to the formula (5), the mold temperature $T_B$ at the point of the positive and negative points of the gradient $\Delta Sn$ is calculated. The mold temperature $T_B$ is related to the state of non-fluid bed formation when the molten resin material is charged into the mold. Namely, the part of higher temperature than the mold temperature $T_B$ resides as a melt region where less non-fluid bed is formed, while the part of lower temperature than the mold temperature $T_B$ remains as a solid region where more non-fluid beds are formed.

The characteristic curve as shown in FIG. 8 may be represented by the following formula:

$$Pn = f(T) \quad (6)$$

The characteristic curve as shown by the above formula (6), may be represented by the following formulae as two different functions belonging respectively to a melt region and a solid region with a boundary of the mold temperature $T_B$.

$$Pmel = f_1(T) \ (T > T_B) \quad (7)$$

$$Psol = f_2(T) \ (T < T_B) \quad (8)$$

Thus, according to this embodiment the appropriate molten material pressure at a predetermined molten material temperature and the fluctuation ranges of the mold temperature may be evaluated in the melt region and the solid region separately. For example, in usual molding, an evaluation except the melt region may be available, while in the complete melt portion such as the hot runner an evaluation except the solid region may be available.

Furthermore, the differential values dPmel/dT and dPsol/dT of the mold temperature T of the functions represented respectively by the formulae (7) and (8) show a stability of the fluctuation of the resin pressure when the loading finished in case the mold temperature is changed. The value, therefore, should preferably be small.

On the other hand, the shapes of the curves of the functions Pmel=$f_1$(T) and Psol=$f_2$(T) based on the formulae (7) and (8) of the maximum resin pressure with a variable of the mold temperature as shown in FIG. 8 are variable in accordance with the properties of the resin to be used and the shape of the molded part, so that preparation of the evaluation standard with the critical values of the differential values dPmel/dT and dPsol/dT are given as the absolute values seems difficult. However, to seize how the maximum resin pressure is changed depending on the mold temperature and how the melt region and the solid region are divided is important in order to obtain more appropriate molding conditions.

Accordingly, an indication of the graph as shown in FIG. 8 on a display apparatus such as liquid crystal, CRT, plasma and EL is effective to determine the appropriate conditions. Furthermore, an indication of the graph as shown in FIG. 8 on a display apparatus facilitates to seize the trends of fluctuations of the mold temperature $T_B$ indicating the boundary between the melt region and the solid region, dPmel/dT and dPsol/dT as hereinbefore described, while the numerical formula of these functions enables to restrict the appropriate range on indication of the display apparatus through the dialogue-type operation by applying the critical values to dPmel/dT and dPsol/dT.

As apparent from various embodiments as hereinbefore described, in accordance with the invention, the ranges of the resin temperature and the mold temperature may conveniently and positively be determined under the appropriate condition to keep a molten resin viscosity at a predetermined level and satisfy a stability of the maximum resin pressure for the fluctuation of the mold temperature.

Accordingly, according to the invention, in the resin flow analysis of the molded part model, the molding conditions for obtaining a molded part of high quality may conveniently be determined through a simple graphic indication and from the advantageous results obtained, various appropriate molding conditions may be selected with considerable effects on preparation of the molding program of the molten resin.

Although the invention has been described hereinabove with its preferred embodiments, particularly the evaluation method of the fluidizing analysis in the molding of the molten resin, many variations and modifications may be made with keeping several advantages as shown herinabove but without departing from the scope and spirit of the invention, for example, it is applicable to molding of the molten materials other than the resin, such as the die-casting machine.

What is claimed is:

1. A method for performing a flow analysis for molding a molten material, comprising dividing a simulated molded part model into a plurality of minute elements and performing numerical analysis thereon; relating at least one temperature condition of the molten material to a plurality of loading time and mold temperature parameters; generating a distribution of the maximum pressure of the molten material for each of said plurality of minute elements, over a range of one of loading time and mold temperature values; indicating said pressure distribution graphically on a display apparatus to enable evaluation of the molten material pressure and loading time at a predetermined molten material temperature; determining desired molding conditions by evaluation of said displayed graphical indication; and controlling a molding process in accordance with said desired molding conditions.

2. The evaluation method according to claim 1, wherein the molten material pressure and the loading time are evaluated according to the function Pn=f $N_1$(t), wherein Pn represents the maximum molten material pressure and t is the loading time, thereby to provide a critical value for the absolute value of the differential dPn/dt.

3. The evaluation method according to claim 1, wherein the molten material pressure and the mold temperature are determined according to the function Pn=f $n_2$(Tm) wherein Pn is the maximum molten material pressure of a given element and Tm is the mold temperature, said function giving a critical value where the mold temperature Tm is dependent on a solidification temperature Tc of the molten material.

4. The evaluation method according to claim 1, wherein the molten material pressure and mold temperature of a given element are determined according to the function Pn=f $n_2$(Tm), where Pn is the maximum molten material pressure of a given element and Tm is the mold temperature, said function giving a critical value for the differential dPn/dTm.

5. The evaluation method according to claim 1, further comprising generating from the obtained pressure distribution of the molten material the maximum molten material pressure over an evaluated portion of each of said plurality of minute elements at each mold temperature, under every temperature condition of the molten material, and generating from the data of the mold temperatures Tn, Tn+1 at two adjoining points and the corresponding maximum molten material pressures Pn, Pn+1, deviations ΔTn=(=Tn+1−Tn) and ΔPn (=Pn+1−Pn) and a deviation ratio ΔPn/ΔTn for successive repetition, and then sequentially calculating an increased gradient ΔSn (=ΔPn+1/ΔTn+1−ΔPn/ΔTn) of the deviation ratio, to compute a mold temperature $T_B$ where the positive and negative positions of the increased gradient ΔSn are reversed, so that the function of the maximum molten material pressure having a variable of the mold temperature is represented as two different functions Pmel=$f_1$(T) and Psol=$f_2$(T) defining the computed mold temperature $T_B$ as a boundary.

6. The evaluation method according to claim 5, wherein said two different functions Pmel=$f_1$(T) and Psol=$f_2$(T) are graphically indicated on a display apparatus so as to determine the appropriate fluctuation ranges of the molten material pressure and the mold temperature at a predetermined molten material temperature.

7. The evaluation method of flow analysis on molding of a molten material according to claim 5, wherein a critical value is imparted to either one of the differential values dPmel/dT and dPsol/dT two different functions Pmel=$f_1$(T) and Psol=$f_2$(T) of the maximum molten material pressure having a variable of the mold temperature to evaluate the function for determination of the appropriate fluctuation ranges of the molten material pressure and the mold temperature.

* * * * *